United States Patent Office 3,188,171
Patented June 8, 1965

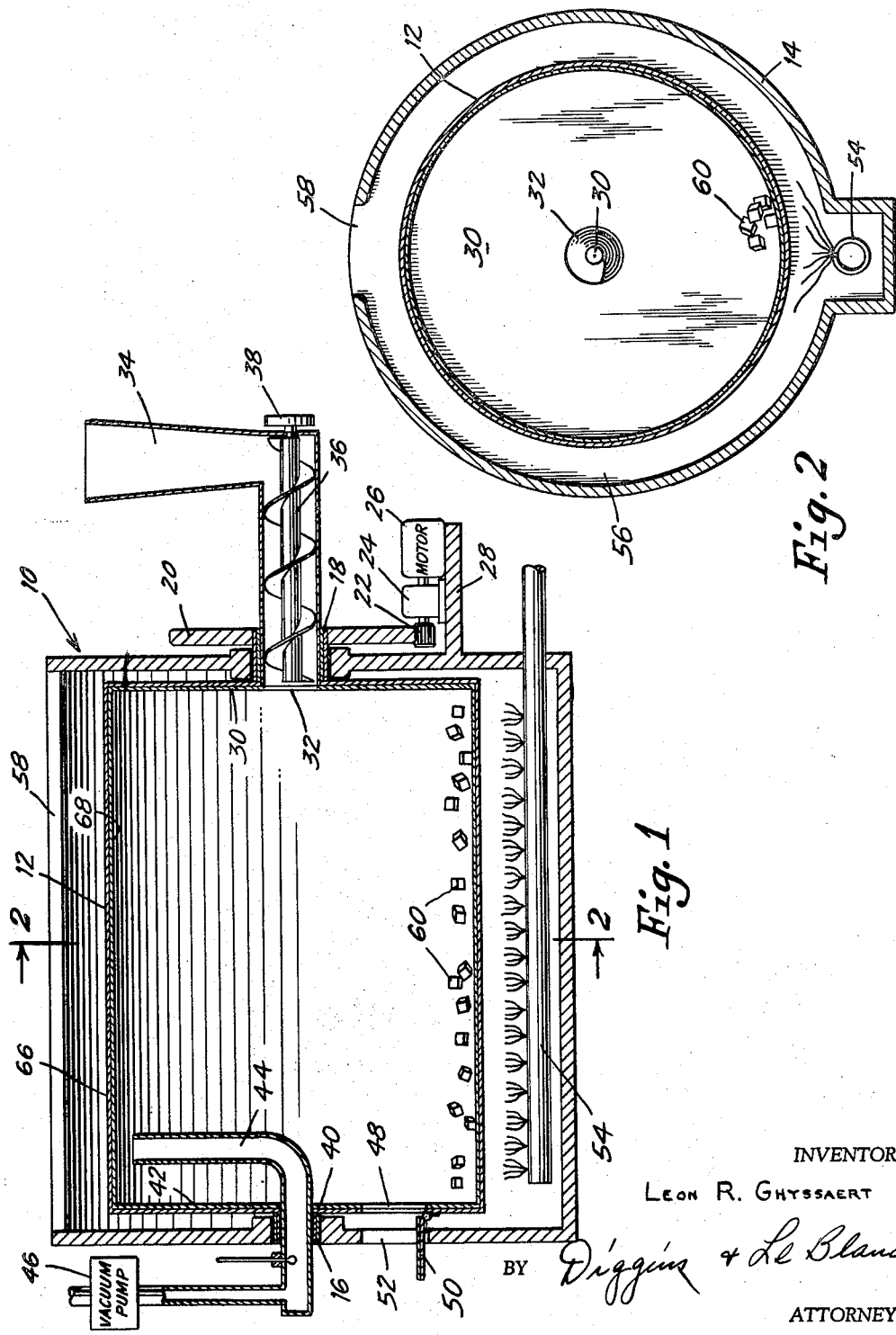

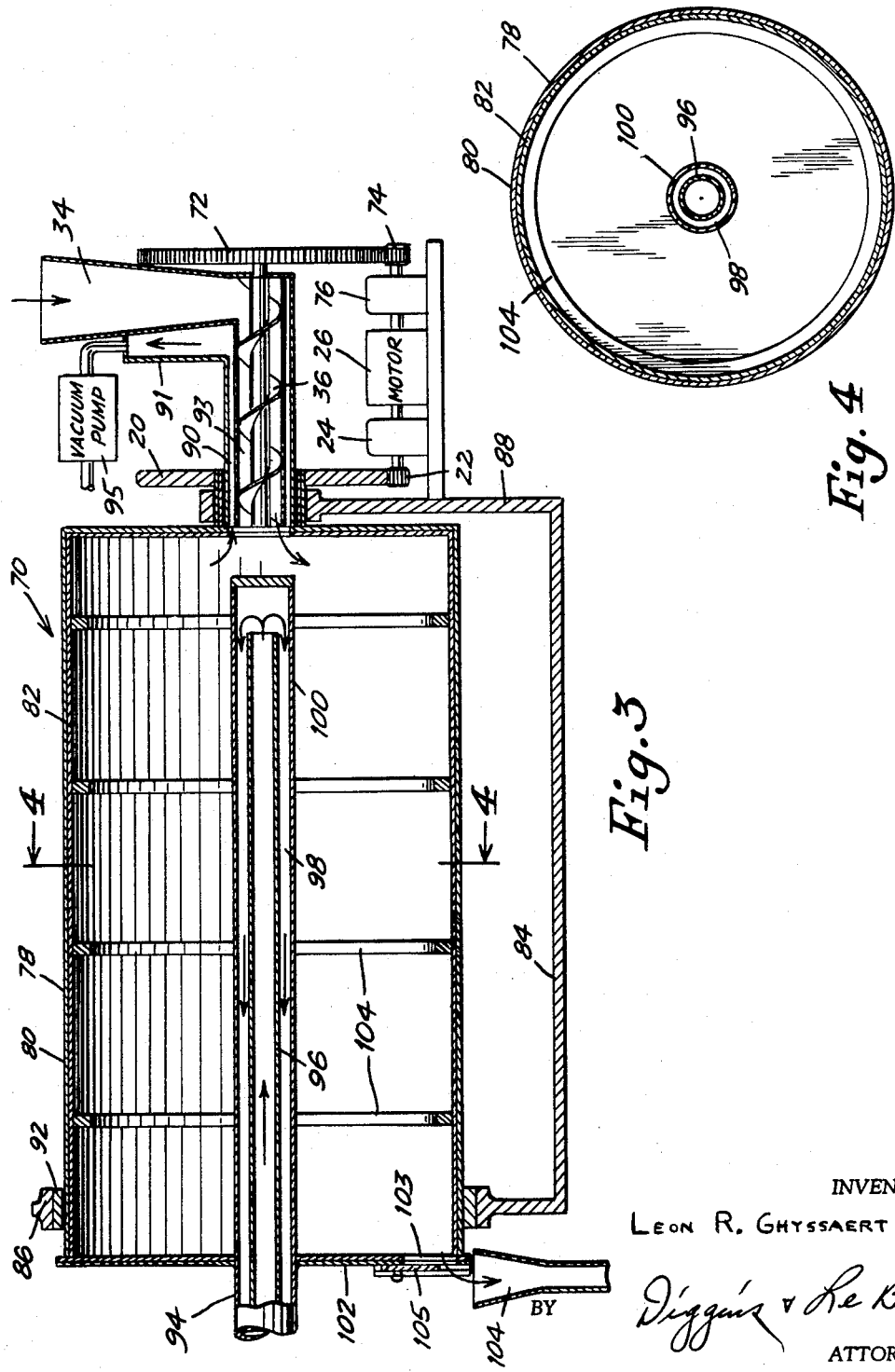

3,188,171
PROCESS FOR PRODUCING METAL CYANATES
Leon Remi Ghyssaert, Fedelgem, Belgium, assignor to Whitmoyer International Ltd., Lebanon, Pa., a corporation of Pennsylvania
Filed Apr. 17, 1961, Ser. No. 103,339
8 Claims. (Cl. 23—75)

This invention relates to a process and apparatus for producing inorganic cyanates and more particularly to an arrangement for producing alkali metal cyanates and thiocyanates by the reaction of urea or thiourea with the alkali metal carbonate.

The cyanate products of the present invention are useful as intermediates in the preparation of organic compounds such as urea derivatives, semi-carboride derivatives, urethanes, and are used in coatings, cements, for treating metal, and are also used in various processes for producing glass.

Alkali cyanates were first produced by the oxidation of the corresponding cyanides. This method was later advantageously replaced by the fusion of a mixture of urea or urea-producing compounds with an alkali metal carbonate. In the past, this fusion has been accomplished by several different methods. Similarly, the fusion of alkali metal carbonates with thiourea has been accomplished.

In recent years, continuous processes have been proposed for producing alkali metal cyanates and thiocyanates by the fusion of a mixture of urea or thiourea with the corresponding metal carbonate. These processes generally involve the use of an excess of urea. In typical fusion processes, heating is continued until a clear liquid is obtained. The melt is then rapidly removed from the source of heat so that the fusion lasts only a few minutes.

A disadvantage of the fusion process results from the fact that the alkali metal cyanates and thiocyanates decompose rapidly upon fusion and the duration of the fusion significantly influences the final yield. The decomposition can be very rapid at melting temperatures and it is difficult to determine when the reaction is complete and when the decomposition has begun. It is very important to minimize this decomposition not only because the yield gets smaller but also because of the formation of the cyanides, the presence of which should be avoided on account of their high toxicity.

Other known processes involving the production of the alkali metal cyanates have serious disadvantages in that they require that the urea and the metal carbonate be finely ground and blended to obtain a homogeneous mixture before fusion. A further disadvantage of the heretofore proposed methods is that the cyanate in fusion returns to a very hard state so that subsequent grinding is required.

The present invention avoids the above-mentioned disadvantages of prior methods by providing a process and apparatus completely eliminating all of the following features: (a) grinding of the raw materials; (b) intimate mixing of the raw materials; (c) very high reaction temperatures; (d) decomposition produced by high temperatures; (e) the requirement for quickly sweeping the reaction mixture out of the reaction zone; and (f) subsequent grinding of the resulting cyanate product.

It is therefore a primary object of the present invention to provide a novel process and apparatus for producing inorganic cyanates.

Another object of the present invention is to provide a novel process for producing alkali metal cyanates and thiocyanates.

Another object of the present invention is to provide both continuous and batch processes for producing alkali metal cyanates and thiocyanates by means of a reaction between urea or thiourea with a metal carbonate.

Still another object of the present invention is to provide a novel process and apparatus for producing alkali metal cyanates and thiocyanates wherein the starting materials may be used in the raw state without any prior grinding or mixing and requiring no subsequent grinding.

These and other objects and advantages of the invention will be more apparent upon reference to the following specification, claims and appended drawings wherein:

FIGURE 1 is an elevation with parts in cross-section illustrating the novel apparatus of the present invention;

FIGURE 2 is a cross-section along line 2—2 of FIGURE 1;

FIGURE 3 is a vertical cross-section through a modified embodiment of the present invention; and FIGURE 4 is a cross-section taken along line 4—4 of FIGURE 3.

Referring to the drawings, FIGURE 1 illustrates a rotary mill generally indicated at 10 particularly suited for batch production of the metal cyanates. The mill 10 comprises a modified ball mill or rotary mill including a rotatable drum 12 surrounded by a fire screen in the form of a housing 14. The drum 12 is rotatably supported in the housing 14 by means of tube 16 and 18 rigidly secured to, and forming a part of the drum 12. Rigidly secured to and rotatable with the hub 18 is a gear 20 driven by way of pinion 22 and gear box 24 from motor 26. The motor and gear box may be conveniently supported on a ledge 28 integral with the fire screen or housing 14. Suitable anti-friction bearings may be utilized if desired to mount the rotary drum in the housing.

End wall 30 of the drum is provided with a feed aperture 32 in alignment with the rotational axis of the drum. A hopper 34 is provided for feeding the raw materials to the interior of the drum and feeding may be accomplished by means of an auger or screw conveyor 36 either manually or automatically operated by means of handle 38.

Passing through a similar aperture 40 formed in the other end wall 42 of the drum is an outlet conduit 44. Outlet conduit 44 and aperture 40 are also in alignment with the rotational axis of the drum and conduit 44 acts to remove volatile components from the drum interior. If desired, a suitable vacuum pump 46 may be provided to create a slight vacuum and assure adequate withdrawal of the volatile mixture during the reaction.

End wall 42 is also provided with a discharge opening 48 having a suitably sealed access door 50. Entrance to the interior of the drum for removal of the metal cyanates at the end of the process is had by way of an opening 52 in the fire screen communicating with the access opening 48.

Positioned beneath the drum 12 is a gas burner 54. Fire screen 14 assures that the heat from burner 54 is maintained in close contact with the outer walls of the drum 12 by way of the annular passageway 56 formed between the drum 12 and housing 14 as best seen in FIGURE 2. The upper surface of the housing or fire screen 14 is provided with an elongated slot 58 through which the exhaust fumes from burner 54 may pass from the apparatus.

The reactants are inserted into hopper 34 and fed into the apparatus by way of auger 36 in the raw state, that is, in the commercial state in which they are initially received without any prior grinding or blending. Intimate mixing is not needed and the reaction temperature is far less than the fusion temperature. For example, the reaction of the present invention in the production of sodium cyanate is carried on at from 250–300° C. while the fusion temperature of this material is in the neighborhood of 525° C. As a result, it is possible to avoid any decomposition of the cyanate product.

Example I

In one example in accordance with the present invention involving the apparatus of FIGURES 1 and 2, a rough mixture of urea and anhydrous sodium carbonate in a molecular proportion ranging from 2.3 to 2.4 moles of urea per mole of sodium carbonate was charged into the rotary mill. The heating was begun slowly, permitting the urea to fuse at about 100° C. The liquid urea acted to keep the sodium carbonate in suspension. The reaction started very soon and evolved water vapor, ammonia and carbonic acid. The mixture of vapors and gases was drawn off from the drum through conduit 44. Heating still further formed a crust on the inner surface of the cylinder. A plurality of heavy particles 60 were provided in the drum to break the crust into a fine powder. The mixture was intimately mixed in the rotating drum and the reaction continued without reaching the fusion temperature. By maintaining the reaction at a temperature in the range of 250–300° C., the reaction soon ended and was noted by the sharp drop in evolution of vapors and gases.

Example II

In the same way (as Example I) a rough mixture of urea and anhydrous potassium carbonate, in a molecular proportion ranging from 2.5 to 2.8 moles of urea per mole of potassium carbonate was charged into the rotary mill. The heating was begun slowly so as to reach after about one hour a temperature between 225–275° C. After 4 to 5 hours at this temperature the evolution of vapors and gases dropped and marked the end of the reaction.

Example III

A rough mixture of thiourea and anhydrous sodium carbonate in a molecular proportion ranging from 2.2 to 2.6 moles of thiourea per mole of sodium carbonate was treated in the same way, the final temperature ranging from 180 to 230° C.

Example IV

To produce lithium cyanate a rough mixture of urea and anhydrous lithium carbonate in a molecular proportion ranging from 2.2 to 2.5 moles of urea per mole of lithium carbonate was used, the final temperature ranging from 200 to 250° C.

It is apparent that the drum 12 may be charged through door 50 if the feed auger 36 is not utilized. The particles 60 which are preferably in the form of metal cubes act to mix and grind the raw materials at the beginning of the operation, during the reaction and also pulverize the cyanate once it is formed.

In the production of the alkali metal cyanates in the drum 12, the metal cyanate crust formed during the reaction is very hard and balls are not always able to pulverize it. An important feature of the present invention involves the recognition of this problem and its solution by providing as the agitating metal particles 60, in place of the more conventional balls, particles of polyhedral shape and preferably metal cubes. The sharp corners of the cubes during rotation of the drum break up even the hardest crust formed and pulverize it into the desired particulate product form.

Since iron and its alloys favor decomposition of cyanates and thiocyanates at high temperatures, the drum 12 is preferably formed of an outer layer 66 of steel and an inner layer 68 of nickel or Monel metal.

FIGURE 3 shows a modified rotary mill apparatus generally indicated at 70 particularly suited for use in a continuous process. Similar parts in FIGURE 3 bear like reference numerals. Feed is again through hopper 34 and the handle 38 of FIGURE 1 is replaced by a large gear 72 driven from motor 26 by way of pinion 74 and a second gear box 76 to provide automatic feed to the interior of rotatable drum 78. The drum is again formed of an outer layer of steel 80 and an inner layer 82 of nickel or other non-ferrous material.

The drum 78 is mounted on a base 84 including a pair of standards 86 and 88. Hub 90 of the drum is rotatably journalled in standard 88 while the opposite end of the drum carries a bearing ring 92 journalled in the standard 86.

Hopper 34 is partially surrounded by a casing 91 defining an annular passage 93 through which the evolved reaction gases pass. Passageway 93 preferably communicates with a vacuum pump 95 establishing a slight vacuum to assist in the removal of gases and vapors from the drum.

The drum is heated by means of a coaxial conduit 94 passing along and concentric with the rotational axis of the drum. Oil burner flue gases or other suitable heating media pass inwardly through the central tube 96 of the conduit and return through the annular passageway 98 between inner tube 96 and outer tube 100.

Drum 78 is preferably mounted at a slight angle to the horizontal so that the charging material during rotation of the drum passes under the influence of gravity from the auger feed end to the opposite end of the drum where the resulting product falls by gravity into a receptacle 104. A stationary annular disc 102 is suitably secured to conduit 94 and closes off the end of the rotating drum. The disc is provided with an outlet aperture 103 near its bottom which can be closed by a vertically slidable door 105. Disc 102 is preferably also formed with an inner layer of non-ferrous material 107. Evolved gases and vapors are passed out from the top of the drum through passageway 93. If desired, a plurality of narrow rings 104 may be secured to the inner surface of the drum. These rings act to retain the raw materials and the agitating particles from advancing too quickly to the open end of the drum.

It is apparent from the above that the present invention provides a novel process and apparatus for producing alkali metal cyanates and thiocyanates. Molecular proportion ranges broader than those given in the examples may also produce desirable quantities of alkali metal cyanates and thiocyanates. It is difficult to state with exactness when the molecular proportion range is such as to be outside the scope of this invention. In general useful urea or thiourea to carbonate mole proportions range from 1.8 to 3.0. In all cases, the reaction temperature is maintained substantially below the fusion temperature of the metal cyanate so that decomposition is completely avoided. The materials may be charged in the raw state with no premixing or pregrinding required. The resulting product is granular in nature and hence subsequent grinding is also eliminated. While described specifically in conjunction with the preparation of certain cyanates and thiocyanates, the other alkali metal cyanates and thiocyanates are formed in the very same manner. The reaction temperature for sodium cyanate ranges from 250–300° C. with the reaction temperature for the other cyanates and thiocyanates usually somewhat less. The reaction time in all cases is not critical and may be varied as desired. The process of the present invention yields cyanates and thiocyanates of very high purity with yields of more than 95% attainable. Moreover, these yields are obtained in a single operation requiring no prior mixing or grinding and no subsequent grinding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for producing alkali metal cyanates comprising introducing into the drum of a rotary mill containing a plurality of inert metal polyhedral-shaped particles a raw mixture of alkali metal carbonate with a compound selected from the group consisting of urea and thiourea in molar proportions ranging from 1.8 to 3.0 of said compound to said carbonate, rotating said drum to agitate said mixture, simultaneously heating said drum to a temperature no greater than 300° C. to react said mixture maintaining the reacting mixture at said temperature for a period of about four to five hours, and passing off the volatile components evolved from said reaction and discharging finely divided ground alkali metal cyanate from the mill.

2. A process according to claim 1 wherein said drum is externally heated.

3. A process according to claim 1 wherein said mixture is continuously fed into one end of said drum and the reaction product is continuously removed from the other end.

4. A process according to claim 1 wherein said carbonate is lithium carbonate.

5. A process according ot claim 1 wherein said compound is urea.

6. A process for producing sodium cyanate comprising subjecting an unground mixture of sodium carbonate with a compound selected from the group consisting of urea and thiourea in molar proportions ranging from 1.8 to 3.0 of said compound to said carbonate to the action of a rotary mill containing a plurality of inert polyhedral-shaped metal particles, simultaneously heating said mill to a temperature from 150°–300° C., maintaining such temperature for a period of about four to five hours and withdrawing the cyanate in finely ground form.

7. A process for producing potassium cyanate comprising subjecting an unground mixture of potassium carbonate with a compound selected from the group consisting of urea and thiourea in molar proportions ranging from 1.8 to 3.0 of said compound to said carbonate to the action of a rotary mill containing a plurality of inert polyhedral-shaped metal particles, simultaneously heating said mill to a temperature from 150°–300° C., maintaining such temperature for a period of about four to five hours and withdrawing the cyanate in finely ground form.

8. A process according to claim 1 in which the raw mixture in the drum is slowly heated over a period of about one hour to attain a temperature of no greater than 300° C. and is held at such temperature for a period of about four to five hours.

References Cited by the Examiner

UNITED STATES PATENTS

| | | | |
|---|---|---|---|
| 386,664 | 7/88 | Solvay | 23—279 |
| 1,232,249 | 7/17 | Dugan | 23—286 |
| 1,406,662 | 2/22 | Liebknecht | 23—75 |
| 1,842,092 | 1/32 | Harshaw et al. | 23—286 |
| 1,879,479 | 9/32 | Punnett | 23—286 |
| 1,915,425 | 6/33 | Kloepfer | 23—75 |
| 2,373,749 | 4/45 | Elkington et al. | 23—279 |
| 2,690,957 | 10/54 | Horst | 23—75 |
| 2,699,418 | 1/55 | Horst | 23—75 X |
| 2,778,716 | 1/57 | Bagley | 23—279 |
| 2,801,154 | 7/57 | De Pree | 33—75 |

MAURICE A. BRINDISI, *Primary Examiner.*